(12) United States Patent
Nguyen (10) Patent No.: US 12,393,793 B2
(45) Date of Patent: Aug. 19, 2025

(54) SYSTEMS AND METHODS FOR USER CLASSIFICATION WITH RESPECT TO A CHATBOT

(71) Applicant: Allstate Insurance Company, Northbrook, IL (US)

(72) Inventor: Dao Nguyen, Huntersville, NC (US)

(73) Assignee: Allstate Insurance Company, Northbrook, IL (US)

( * ) Notice: Subject to any disclaimer, the term of this patent is extended or adjusted under 35 U.S.C. 154(b) by 233 days.

(21) Appl. No.: 17/993,114

(22) Filed: Nov. 23, 2022

(65) Prior Publication Data
US 2024/0169163 A1    May 23, 2024

(51) Int. Cl.
*G06F 40/56*     (2020.01)
*G06F 40/295*    (2020.01)
*G06F 40/30*     (2020.01)
*H04L 51/02*     (2022.01)

(52) U.S. Cl.
CPC ............ *G06F 40/56* (2020.01); *G06F 40/295* (2020.01); *G06F 40/30* (2020.01); *H04L 51/02* (2013.01)

(58) Field of Classification Search
CPC ...................................................... H04L 51/02
See application file for complete search history.

(56) References Cited

U.S. PATENT DOCUMENTS

| | | | |
|---|---|---|---|
| 6,944,592 B1* | 9/2005 | Pickering | G10L 15/22 704/251 |
| 7,933,775 B2* | 4/2011 | Quibria | H04M 3/46 704/270.1 |
| 7,933,776 B2* | 4/2011 | Nagashima | G10L 15/22 704/251 |

(Continued)

FOREIGN PATENT DOCUMENTS

| | | |
|---|---|---|
| EP | 3557498 A1 | 10/2019 |
| WO | 2021262408 A1 | 12/2021 |

OTHER PUBLICATIONS

Nirala, Krishna Kumar; Singh Nikhil Kumar; and Purani, Vinay Shivshanker. A Survey on Providing Customer and Public Administration Based Services Using AI: Chatbot (https://link.springer.com/article/10.1007/s11042-021-11458-y), Jan. 3, 2022, 32 pgs.

(Continued)

*Primary Examiner* — Jesse S Pullias
(74) *Attorney, Agent, or Firm* — Dinsmore & Shohl LLP (57) ABSTRACT

A system includes a computing device configured to prompt a user to provide an open-ended query, receive, from an input device, the open-ended query, process the open-ended query with an artificial intelligence model. The computing device further classifies the user as either a first or second user level based on attributes of the open-ended query, and executes a rules-engine to analyze the intents and the entities identified by the artificial intelligence model and identify a fulfillment task from a plurality of rule defined tasks corresponding to the analysis of the intents and the entities such (Continued)

that the fulfillment task is identified to fulfill at least the intents. In response to classifying the user as the first user level, the computing device executes the fulfillment task, and in response to classifying the user as the second user level, the user is prompted with closed-ended inquiries to obtain additional intents or entities.

18 Claims, 5 Drawing Sheets

(56) References Cited

U.S. PATENT DOCUMENTS

| | | | |
|---|---|---|---|
| 10,219,122 B1* | 2/2019 | Scanlon | H04W 4/025 |
| 11,551,188 B2* | 1/2023 | Jonnalagadda | G06F 40/56 |
| 11,758,044 B1* | 9/2023 | Olson | H04M 3/5166 |
| | | | 379/218.01 |
| 2014/0201126 A1 | 7/2014 | Zadeh et al. | |
| 2015/0199754 A1 | 7/2015 | Greystoke et al. | |
| 2018/0025726 A1 | 1/2018 | Gatti et al. | |
| 2019/0042988 A1 | 2/2019 | Brown et al. | |
| 2019/0306341 A1 | 10/2019 | Matysiak et al. | |
| 2019/0325868 A1 | 10/2019 | Lecue et al. | |
| 2020/0004813 A1 | 1/2020 | Galitsky | |
| 2020/0007380 A1* | 1/2020 | Chen | H04L 51/02 |
| 2021/0082420 A1* | 3/2021 | Kraljic | G06F 40/30 |
| 2021/0240935 A1 | 8/2021 | Galitsky | |
| 2023/0245651 A1* | 8/2023 | Wang | G06N 5/022 |
| | | | 704/275 |

OTHER PUBLICATIONS

What Is a Chatbot? (https://www.oracle.com/chatbots/what-is-a-chatbot/), Jan. 18, 2022, 7 pgs.

Strahan, Bob; Calhoun, John; and Potterveld, Bob. Create a Question and Answer Bot with Amazon Lex and Amazon Alexa (https://aws.amazon.com/blogs/machine-learning/creating-a-question-and-answer-bot-with-amazon-lex-and-amazon-alexa/), Sep. 21, 2017, 60 pgs.

* cited by examiner

SYSTEMS AND METHODS FOR USER CLASSIFICATION WITH RESPECT TO A CHATBOT

TECHNICAL FIELD

The present disclosure relates to systems, methods, and computer implemented programs providing chatbots employing infrastructure and rules that utilize artificial intelligence models and rule-engines enabling user navigated conversations with chatbots.

BACKGROUND

Chatbots are systems used to conduct automated conversations via text or voice based channels of communication. Chatbots interact with users through messaging platforms such as online messaging services, mobile device based text messaging applications, automated phone and voice systems and the like. Chatbots may be programmed to respond to an intent of the individual with who the chatbot is interacting in a conversation such that the chatbot prompts the individual to provide information necessary to fulfill the intent, for example, complete a desired fulfillment task.

Chatbots can be pre-programmed with conversation flows that are led and navigated by the chatbot system. As the sophistication of the chatbots increases so does the complexity in the conversation flows because static models of conversation flows must often be updated to accommodate new features, product offerings, and/or services, increasing a time and expense to change and maintain static conversation flows for chatbots. As the static conversation flows grow over time, so does the complexity, which can detract companies from improving existing systems and instead redeveloping and deploying entirely new static conversation flows.

Additionally, static conversation flows employed by chatbots may lead to frustrating experiences for users that may understand the information a system requires to complete a task they are requesting assistance with.

Accordingly, a needs exists to improve deployment of chatbots and the experiences chatbots can provide.

SUMMARY

In an embodiment, a system includes a computing device comprising a processor and a non-transitory computer readable memory. The computing device configured to prompt a user to provide an open-ended query, receive, from an input device, the open-ended query, process the open-ended query with an artificial intelligence model implemented by the computing device, the artificial intelligence model trained to identify one or more intents and one or more entities expressed in the open-ended query, classify the user as either a first user level or a second user level based on one or more attributes of the open-ended query, where the first user level indicates the user is more experienced with the system than the second user level, and execute a rules-engine configured to analyze the one or more intents and the one or more entities identified by the artificial intelligence model and identify a fulfillment task from a plurality of rule defined tasks corresponding to the analysis of the one or more intents and the one or more entities such that the fulfillment task is identified to fulfill at least the one or more intents, where each of the plurality of rule defined tasks includes one or more required parameters defining one or more task specific intents and entities to fulfill the task. In response to classifying the user as the first user level, the computing device is configured to execute the fulfillment task, and in response to classifying the user as the second user level, the computing device is configured to prompt the user with one or more closed-ended inquiries to obtain one or more additional intents or one or more additional entities from the user.

In some embodiments, a method for employing a chatbot includes prompting, via a computing device, a user to provide an open-ended query, receiving, at the computing device from an input device, the open-ended query, process the open-ended query with an artificial intelligence model implemented by the computing device, the artificial intelligence model trained to identify one or more intents and one or more entities expressed in the open-ended query, classifying the user as either a first user level or a second user level based on one or more attributes of the open-ended query, where the first user level indicates the user is more experienced with the chatbot than the second user level, executing a rules-engine configured to analyze the one or more intents and the one or more entities identified by the artificial intelligence model and identify a fulfillment task from a plurality of rule defined tasks corresponding to the analysis of the one or more intents and the one or more entities such that the fulfillment task is identified to fulfill at least the one or more intents, wherein each of the plurality of rule defined tasks includes one or more required parameters defining one or more task specific intents and entities to fulfill the task, in response to classifying the user as the first user level, executing the identified fulfillment task, and in response to classifying the user as the second user level, prompting the user with one or more closed-ended inquiries to obtain one or more additional intents or one or more additional entities from the user.

In some embodiments, a non-transitory computer-readable medium storing instructions that, when executed by a computer processor, cause the computer processor to perform a method associated with a chatbot. The method executed by the computer processor includes prompting a user to provide an open-ended query, receiving the open-ended query, processing the open-ended query with an artificial intelligence model implemented by the computer processor, the artificial intelligence model trained to identify one or more intents and one or more entities expressed in the open-ended query, classifying the user as either a first user level or a second user level based on one or more attributes of the open-ended query, where the first user level indicates the user is more experienced with the chatbot than the second user level, executing a rules-engine configured to analyze the one or more intents and the one or more entities identified by the artificial intelligence model and identify a fulfillment task from a plurality of rule defined tasks corresponding to the analysis of the one or more intents and the one or more entities such that the fulfillment task is identified to fulfill at least the one or more intents, wherein each of the plurality of rule defined tasks includes one or more required parameters defining one or more task specific intents and entities to fulfill the task, in response to classifying the user as the first user level, executing the fulfillment task, and in response to classifying the user as the second user level, prompting the user with one or more closed-ended inquiries to obtain one or more additional intents or one or more additional entities from the user.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure relate to systems, methods, and computer implemented programs providing chatbots employing user navigated designs that utilize artificial intelligence models and rule-engines enabling user navigated conversations with chatbots. In user to user conversations, both parties can lead the conversation and change the subject at any given time. Users can provide information throughout the conversation in an unconstrained manner. Chatbots according to embodiments described herein are designed to conduct conversations with a user based on a determined skill level of the user and further dynamically utilize rules for determining tasks that the user desires based on the user instead of relying on static conversation flow designs that are independent of the user. Further, conversation flow is not chatbot led and forced unless the skill level of the user requires closed-ended inquires to extract the necessary information from the user.

As described in more detail herein, when the user demonstrates a skill level (e.g., a sophistication) that indicates a capability to freely provide the needed information to select and complete an automated task, then open-ended inquiries and open-ended responses are employed. As used herein, closed-ended inquires refers to a conversation format where prompts are designed to solicit "yes" or "no" responses or a choice between specific options from a party in the conversation. On the other hand, open-ended inquires refers to a conversation format where the prompts are not seeking a static response and instead provide parties in the conversation to provide narrative type responses.

Embodiments of the present disclosure do not force users (e.g., a party interacting with the chatbot system) to follow static prescriptive conversations flows, but instead allows users to lead and navigate conversations with the chatbot system. Additionally, as described in more detail herein, the skill level of the user is assessed and segmented into at least two different groups, a first level (e.g., expert group) and a second level (e.g., an entry group) where the first level of user is more experienced than the second level of user with the chatbot system. When a user is determined to be in the second level, the chatbot system may initiate a lead navigator role in the conversation and direct the conversation with closed-end inquires. Conversely, when a user determined to be in the first level, the user is allowed to lead and navigate the conversation through open-ended queries for the chatbot system to analyze and for which to prepare a response. From time to time during the conversation with a user identified to be a first level user, the chatbot system may prompt the user to provide more information on a particular subject area, but this is done through open-ended inquiries and prompts prioritized before any closed-ended inquiries are used if needed.

The open-ended queries received by the chatbot system from a user are processed using artificial intelligence models to extract intents, entities, and states which are used by a rules-engine to determine when parameters for a task from a plurality of rule defined tasks is satisfied. As used herein, "intents" refer to written or spoken words or phrases that indicate what the user seeks to accomplish or attain (e.g., renew a car insurance policy). As used herein, "entities" refer to written or spoken words or phrases that indicate objects and subjects (e.g., a vehicle is identified as a certain brand). Additionally, the term "states" refers to words of confirmation and validation or the opposite used in conversation to acknowledge a task and details of a task before action is taken to fulfill the task (e.g., a user responds with a yes as a state when an inquiry is made as to whether the user wishes to add a vehicle of a certain brand associated with the user to a car policy).

The rules-engine will be described in more detail herein, but generally the rules-engine is responsible for evaluating intents and entities expressed by a user in the open-ended query against a set of predefined rules and identify a task or action. The set of predefined rules, which can include different subsets of one or more rules associated with a plurality of rule defined tasks from which the task or action is identified, define required parameters including one or more task specific intents and entities required to fulfill one or more tasks. The rules-engine may also generate and provide further prompts to the user, in either closed-ended or open-ended form, in response to a user's expressed intents and entities to obtain additional information needed to fulfill the parameters for a rule defined task in order to execute the task.

Embodiments of the present disclosure enable more natural communication flows between a chatbot system and a user while providing the ability for the chatbot system to recognize when a user is an expert or entry level user and adjust the conversation flow accordingly. Further, the chatbot system may apply a prioritization of rules used to identify the task or action based on such a classification of the user as an expert or entry level user.

Turning now to the drawings, the systems, methods, and computer implemented programs providing chatbots employing user navigated designs that utilize artificial intelligence models and rule-engines enabling user led conversations with chatbots are now described.

Figure 1:
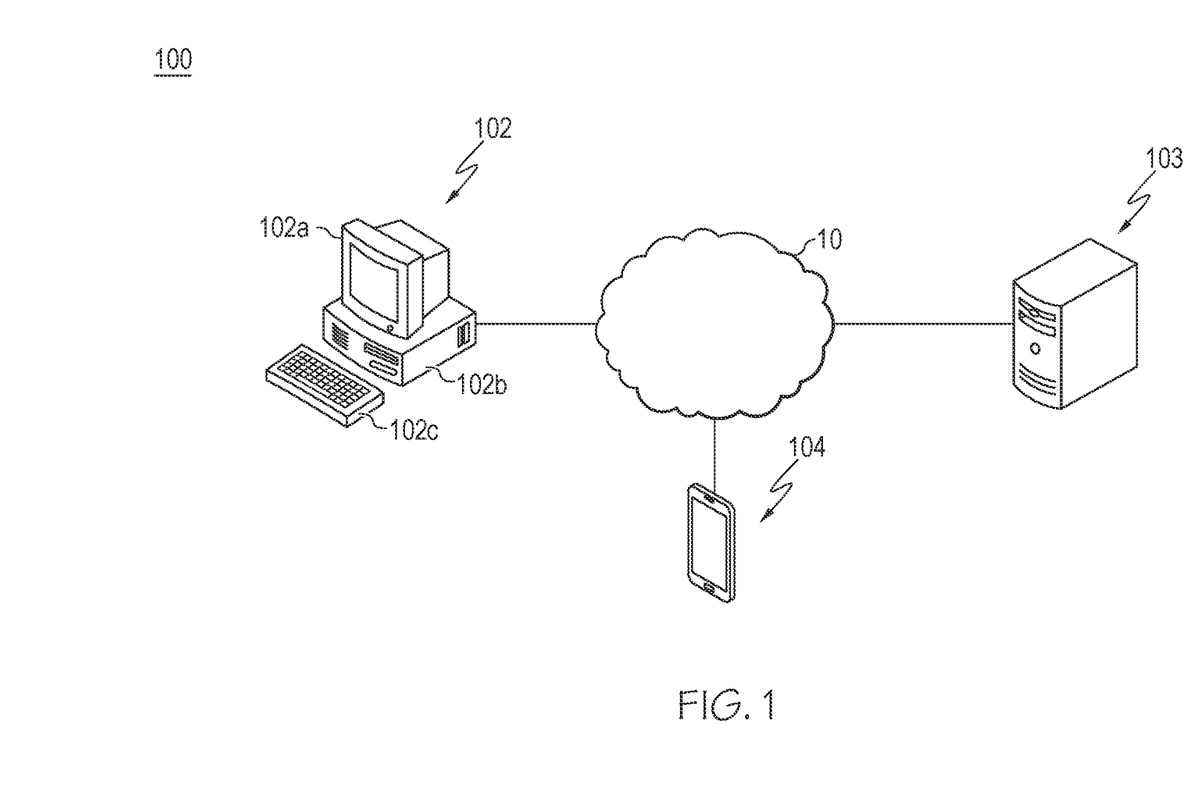
FIG. 1 schematically depicts an illustrative chatbot system, according to one or more embodiments shown and described herein.

Referring to FIG. 1, chatbots (also referenced as systems 100 or chatbot systems 100 herein) are generally deployed on a computing device 102 or server 103 connected to a network 10 in order to interact with a user through another computing device 102 or electronic device 104 such as a mobile phone, tablet, or personal computer. As illustrated in FIG. 1, a network 10 may include a wide area network, such as the internet, a local area network (LAN), a mobile communications network, a public service telephone network (PSTN) and/or other network and may be configured to electronically connect a computing device 102, a server 103, and an electronic device 104 enabled with an application for a user interface with a chatbot.

The computing device 102 may include a display 102*a*, a processing unit 102*b* and an input device 102*c*, each of which may be communicatively coupled to together and/or to the network 10. The computing device 102 may be used to deploy the chatbot configured to employ user navigated conversations as described herein. The computing device 102 may also be utilized to interface with the artificial intelligence model and/or rules-engine of the chatbot system to update or reconfigure the operation of the chatbot system 100. The server 103 may maintain user profiles, user policies, and the like.

It should be understood that while the computing device 102 and the electronic device 104 are depicted as a personal computer and a mobile phone, respectively, and a server 103, these are merely examples. More specifically, in some embodiments, any type of computing device (e.g., mobile computing device, personal computer, server, and the like) may be utilized for any of these components. Additionally, while each of these computing devices is illustrated in FIG. 1 as a single piece of hardware, this is also an example. More specifically, each of the computing device 102, the server 103, and electronic device 104 may represent a plurality of computers, servers, databases, and the like.

Figure 2:
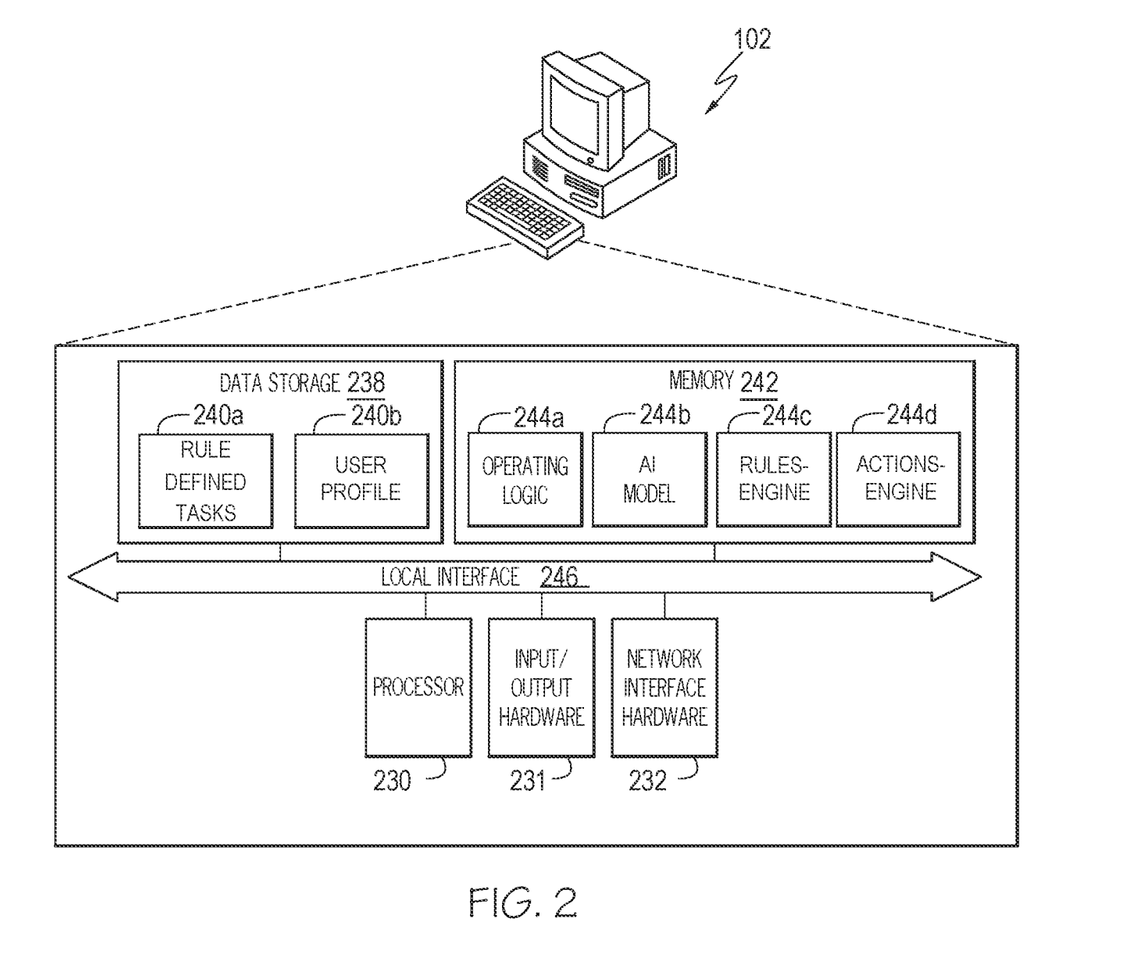
FIG. 2 schematically depicts an illustrative computing device for deploying a chatbot, according to one or more embodiments shown and described herein.

FIG. 2 depicts an illustrative computing device 102 for deploying a chatbot, while further illustrating the components and data stored thereon for implementing the chatbot. The computing device 102 may utilize hardware, software, and/or firmware, according to embodiments shown and described herein. While in some embodiments, the computing device 102 may be configured as a general-purpose computer with the requisite hardware, software, and/or firmware, in some embodiments, the server 103 may be configured as a special purpose computer designed specifically for performing the functionality described herein.

As illustrated in FIG. 2, the computing device 102 includes a processor 230, input/output hardware 231, network interface hardware 232, a data storage component 238, which stores a plurality of rule defined tasks 240*a* and user profiles 240*b*, and a memory component 242. The memory component 242 may be machine readable memory (which may also be referred to as a non-transitory processor readable memory or medium that stores instructions which, when executed by the processor 230, causes the processor 230 to perform a method or control scheme as described herein). The memory component 242 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory component 242 may be configured to store operating logic 244*a*, one or more artificial intelligence models (e.g., AI model) 244*b*, a rules-engine 244*c*, and an actions-engine 244*d* (each of which may be embodied as a computer program, firmware, or hardware, as an example). A local interface 246 is also included in FIG. 2 and may be implemented as a bus or other interface to facilitate communication among the components of the computing device 102.

The processor 230 may include any processing component(s) configured to receive and execute programming instructions (such as from the data storage component 238 and/or the memory component 242). The instructions may be in the form of a machine readable instruction set stored in the data storage component 238 and/or the memory component 242. The input/output hardware 231 may include a monitor, keyboard, mouse, printer, microphone, speaker, and/or other device for receiving, sending, and/or presenting data. The network interface hardware 232 may include any wired or wireless networking hardware, such as a modem, LAN port, Wi-Fi card, WiMax card, mobile communications hardware, and/or other hardware for communicating with other networks and/or devices.

It should be understood that the data storage component 238 may reside local to and/or remote from the computing device 102 and may be configured to store one or more pieces of data for access by the computing device 102 and/or other components. As illustrated in FIG. 2, the data storage component 238 includes a plurality of rule defined tasks 240*a* and user profiles 240*b*. The plurality of rule defined tasks 240*a* are based on a set of rules defining one or more required parameters and conditions for executing each of the rule defined tasks. The one or more required parameters define one or more task specific intents and entities to fulfill the particular tasks. The rule defined tasks may be generated via the set of rules including a bottom-up design. First, via the bottom-up design, various tasks as fulfillment tasks are developed. For example, under a category of changing a policy, tasks such as adding a car to a policy, removing a car to a policy, adding spouse to a policy, and removing a spouse from a policy are generated. Once the various tasks (e.g., actions related to a broader task such as changing a policy) are generated, a bottom-up design process is implemented. That is, one or more required parameters including intents, entities, and optionally other parameters are identified and defined for each of the various tasks and used with a bottom-up designed set of rules to complete and fulfill the tasks. The result is a plurality of rule defined tasks for various tasks. A bottom-up design approach enables a user navigated design to be readily edited, updated, and added to without having to redesign complex static conversation flows.

Still referring to FIG. 2, the data storage component 238 may further include user profiles 240*b*. For users that are account holders or have interacted with the chatbot in a previous session may have a user profile 240*b*. The user profile 240*b* incorporates details such as entity information regarding their current policies and/or information that they have provided to the chatbot system 100 during previous interactions. In this way, for example, if a user interacted with a chatbot system 100 to obtain an insurance quote in the advance of a purchase of a new or used vehicle, the user profile may be updated with the vehicle information so that should the user purchase the vehicle and initiate a later interaction with the chatbot to add a new vehicle to their policy, the chatbot may extract from the user's profile and subsequently confirm the previously provide vehicle information instead of requesting that the user provide all the vehicle details again in the subsequent session. The user profile 240*b* may include other information as well, such as bibliographic information, a listing of other policies, driving history, claims history, and/or the like.

Included in the memory component 242 are the operating logic 244*a*, the AI model 244*b*, the rules-engine logic 244*c*, and the actions-engine logic 244*d*. The operating logic 244*a* may include an operating system and/or other software for managing components of the computing device 102. The operating logic 244*a* may further include logic for classifying the user as either a first level (e.g., expert group) or a second level (e.g., an entry group) user that is less experienced with the chatbot system 100 than the first level user. In some embodiments, classifying the user as a first level or a second level user may include first determining one or more attributes of the open-ended query. The one or more attributes include at least one of a length of the open-ended query, a number of intents expressed in the open-ended query, or a number of entities expressed in the open-ended query. The classification of the user may further include determining that at least one of the length of the open-ended query exceeds a predetermined length threshold, a number of intents expressed in the open-ended query exceeds a predetermined intents threshold, or a number of entities expressed in the open-ended query exceeds a predetermined entities threshold. When at least one of the length of the open-ended query exceeds a predetermined length threshold, a number of intents expressed in the open-ended query exceeds a predetermined intents threshold, or a number of entities expressed in the open-ended query exceeds a predetermined entities threshold, the user may classified as a first level user (e.g., an expert user), and when the aforementioned criteria is not met, then the user may be classified as a second level user (e.g., an entry user).

The AI model 244b includes a machine learning model trained to identify one or more intents and one or more entities expressed in the open-ended query. The AI model may implement a variety of AI models such as natural language processing, neural networks, and/or the like. The AI model 244b may be trained and provided machine learning capabilities via a neural network as described herein. By way of example, and not as a limitation, the neural network may utilize one or more artificial neural networks (ANNs). In ANNs, connections between nodes may form a directed acyclic graph (DAG). ANNs may include node inputs, one or more hidden activation layers, and node outputs, and may be utilized with activation functions in the one or more hidden activation layers such as a linear function, a step function, logistic (sigmoid) function, a tanh function, a rectified linear unit (ReLu) function, or combinations thereof. ANNs are trained by applying such activation functions to training data sets to determine an optimized solution from adjustable weights and biases applied to nodes within the hidden activation layers to generate one or more outputs as the optimized solution with a minimized error. In machine learning applications, new inputs may be provided (such as the generated one or more outputs) to the ANN model as training data to continue to improve accuracy and minimize error of the ANN model. The one or more ANN models may utilize one to one, one to many, many to one, and/or many to many (e.g., sequence to sequence) sequence modeling. The chatbot system 100 may utilize one or more ANN models (e.g., as AI models 244b) as understood to those skilled in the art or as yet-to-be-developed as described in embodiments herein. Such ANN models may include artificial intelligence components selected from the group that may include, but not be limited to, an artificial intelligence engine, Bayesian inference engine, and a decision-making engine, and may have an adaptive learning engine further comprising a deep neural network learning engine. The one or more ANN models may employ a combination of artificial intelligence techniques, such as, but not limited to, Deep Learning, Random Forest Classifiers, Feature extraction from audio, images, clustering algorithms, or combinations thereof.

In embodiments, a convolutional neural network (CNN) may be utilized. For example, a convolutional neural network (CNN) may be used as an ANN that, in a field of machine learning, for example, is a class of deep, feed-forward ANNs applied for audio-visual analysis of the captured disturbances. CNNs may be shift or space invariant and utilize shared-weight architecture and translation invariance characteristics. Additionally or alternatively, a recurrent neural network (RNN) may be used as an ANN that is a feedback neural network. RNNs may use an internal memory state to process variable length sequences of inputs to generate one or more outputs. In RNNs, connections between nodes may form a DAG along a temporal sequence. One or more different types of RNNs may be used such as a standard RNN, a Long Short Term Memory (LSTM) RNN architecture, and/or a Gated Recurrent Unit RNN architecture.

By way of example, and not as a limitation, a convolutional neural network (CNN) may be utilized for the AI model 244b. Data stored and manipulated in the chatbot system 100 as described herein is utilized by the AI model 244b, which can leverage a cloud computing-based network configuration such as a cloud platform (e.g., which may be the network 10 of FIG. 1) to apply machine learning and artificial intelligence. This machine learning application may create models that can be applied by the chatbot system 100, to make it more efficient and intelligent in execution. The AI model 244b may be configured to parse text or voice provided by the user in the open-ended query and identify words and phrases expressing intents or entities. The AI model 244b may further categorize the intents, for example, into categories including but not limited to object, location, date, time amount, value, or the like type words and phrases.

The rules-engine 244c encompasses several processes that match intents and entities expressed by the user in an open-ended query with the required parameters for the plurality of rule defined tasks. The rules-engine 244c may further be configured to solicit additional intent and entity information from the user through open-ended or closed-ended inquiries. The matching process may include a scoring process that assigns a score to each of the rule defined tasks based on the number of required parameters that are satisfied by the intents and entities expressed by the user. The scored plurality of rule defined tasks may further be prioritized based on their score and the specificity of the task. For example, a user may express an intent to change a policy, but they are not specific as to what policy they want to change or what changes they want to make to the policy. That is, they may express a general intent. When a general intent is expressed, follow ups from the chatbot system may be needed to execute a task.

In some instances, a user may express more than one desired task in their open-ended query. In such a case and other cases, the prioritization process based on the score and the specificity of the task can assist with identifying the order in which the tasks are executed. For example, if the user is expresses an intent to change an auto policy by adding a new vehicle and further provided the required entity information for executing the task based on the required parameters defined for the rule defined task, but merely expresses an intent to add another driver to the policy without entity information relating to who the additional driver will be, the task of changing the auto policy to add the new vehicle is prioritized over the adding an additional driver to the policy. This is merely a non-limiting example. It should be understood that the rules-engine 244c may be multifunctional in the way a task to be executed is identified, but a principal feature of the rules-engine is implementation of rule defined tasks in determining further conversation with the a user and the selection of a task to be executed. The rules-engine 244c will be described further in the following disclosure.

The actions-engine 244*d* encompasses logic configured to fulfill the task identified by the rules-engine 244*c*. The actions-engine 244*d* includes logic that facilities execution of the one or more tasks identified by the rules-engine 244*c*. The actions-engine 244*c* may include processes for accessing databases and update, changing, and/or removing information as necessary for fulfilling the task. The actions-engine 244*c* may enable the computing device 102 to connect to one or more external devices connected via the network, such as the server 103, to complete execution of the one or more tasks identified by the rules-engine 244*c*.

Figure 3:
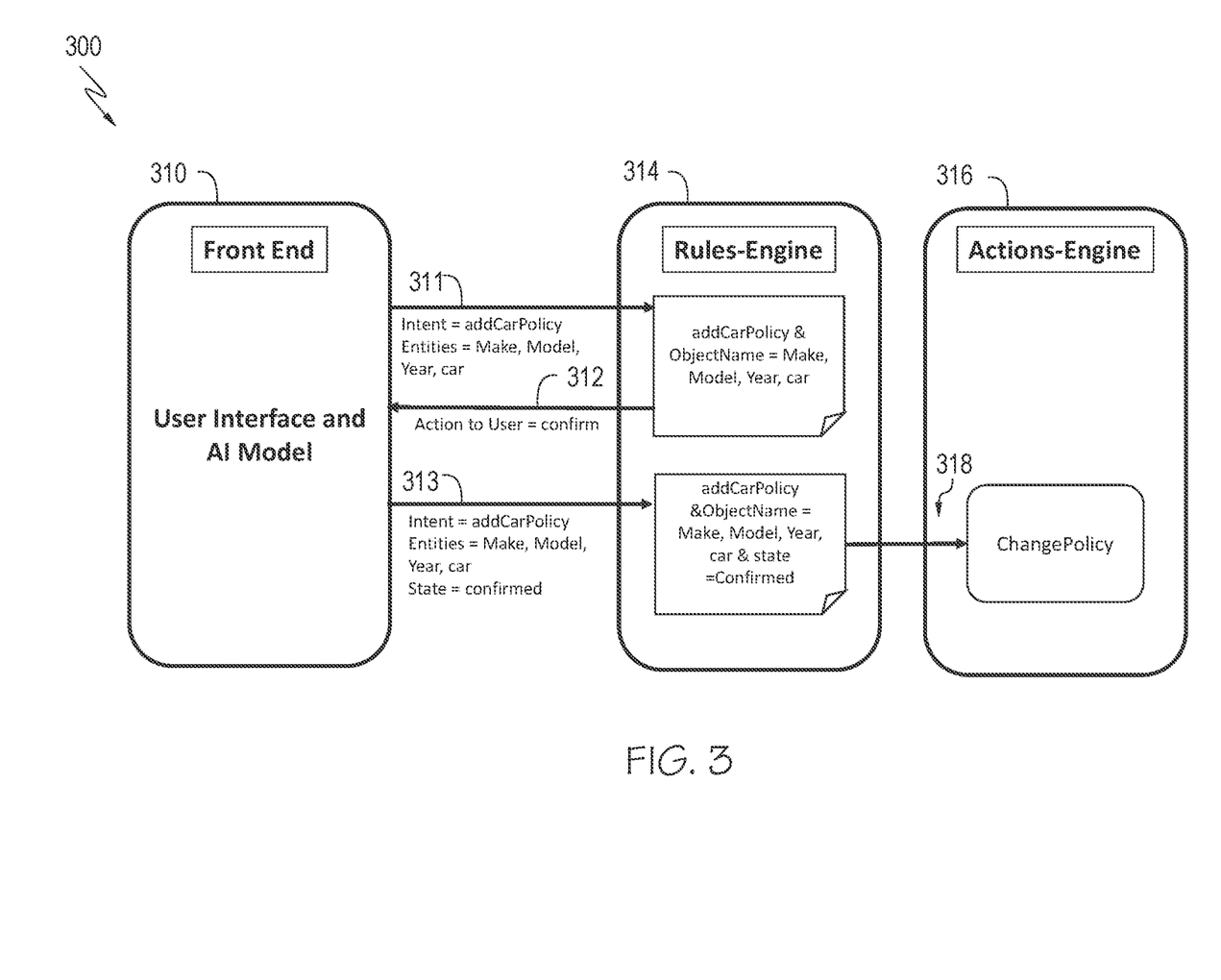
FIG. 3 depicts a first illustrative user navigated conversation flow, according to one or more embodiments shown and described herein.
Figure 4:
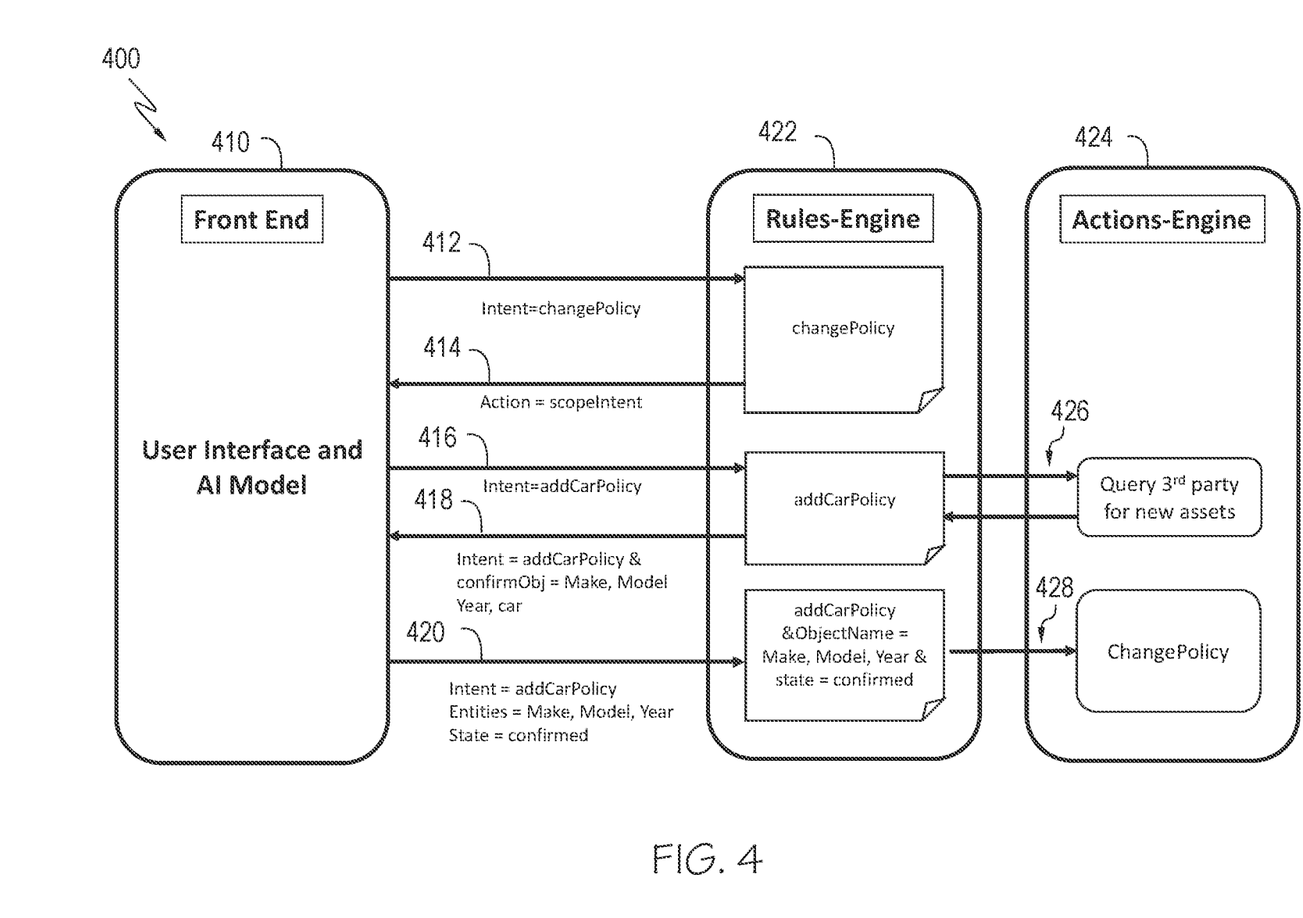
FIG. 4 depicts a second illustrative user navigated conversation flow, according to one or more embodiments shown and described herein.

Turning to FIGS. 3 and 4, illustrative chatbot processes 300, 400 for user navigated conversation flows are shown employing a rules-engine and classifying the user to improve chatbot communication with the user by tailoring the types of follow up inquiries with the user. Referring to FIG. 3, the first chatbot processing process 300 is depicted with respect to three general components of a front end 310, a rules-engine 314, and an actions-engine 316, each of which may be deployed by a computing device 102 or implemented across a system of computing devices 102. At the front end 310, hardware and software are configured to interface with a user. This may include providing a display and input and output devices that enable a user to provide direct inputs into the computing device 102 or communication hardware that enables network based communication between the computing device 102 and user's devices such as an electronic device 104. The front end 310 further includes the one or more AI models 244*b* that receive an open-ended query input from a user and process the open-ended query to identify one or more intents and one or more entities expressed in the open-ended query.

In the present example depicted in FIG. 3, a user is interested in making a change to their auto insurance policy by adding a new vehicle. For example, when prompted by the chatbot system 100, the user may input the following request "I need to add my new YEAR, MAKE, MODEL vehicle to my policy" "YEAR, MAKE, MODEL" are placeholders indicating that the user provided this specific entity information instead of simply stating "I need to add my by vehicle to my policy" which expresses an intent, but is absent specific entities.

The rules-engine 314 receives intents and entities identified by the AI model as depicted by communication line 311. The rules-engine 314 uses the intent to identify the corresponding rule based fulfillment task, which includes a set of required parameters for fulfilling the task. The rules-engine 314 may provide an action back to the user through the front end 310 to confirm the fulfillment task expressed through the intent as depicted by communication line 312. In the instance illustrated in FIG. 3, the user provided sufficient entity information for the task of adding a new vehicle policy. As such, once a confirmation is received as a state and as depicted by communication line 313, the rules-engine 314 triggers the actions-engine 316 to execute the identified fulfillment task to change the policy as depicted by communication line 318.

Referring to FIG. 4, another chatbot process 400 is depicted. At the front end 410, hardware and software are configured to interface with a user. This may include providing a display and input/output devices that enable a user to provide direct inputs into the computing device 102 or communication hardware that enables network based communication between the computing device 102 and user's devices such as an electronic device 104. The front end 410 further includes the one or more AI models 244*b* that receive an open-ended query input from a user and process the open-ended query to identify one or more intents and one or more entities expressed in the open-ended query. One or more AI models 244*b* may also be trained to classify the user as a first user level or a second user level based on one or more attributes of the open-ended query.

In the example depicted in FIG. 4, a user is interested in making a change to their auto insurance policy by adding a new vehicle. For example, when prompted by the chatbot system 100, the user inputs the following open-ended query "I want to update my policy". The AI model 244*b* in the front end 410 processes the open-ended query. The intent of changing a policy is entered into the rules-engine 422 as depicted by communication line 412. The rules-engine 422 determines that the intent is a general intent and thus requires the scope of the intent to be further defined. Accordingly, the rules-engine 422 prompts the front end 410 to take an action to solicit additional information regarding the user's intent as depicted by communication line 414. In some instances, when a user provides an open-ended query that only states a general intent and nothing further, the user may be classified as a second level user (e.g., an entry level user). If such a classification is made, then further prompts to the user may be formatted as closed-ended inquiries.

In the illustrated example, the user responds stating "I would like to add a car to my policy." The intent of changing a car policy to add a car is input to the rules-engine 422 as depicted by communication line 416. In this case, although the information provided to the rules-engine 422 did not include entities, such as the YEAR, MAKE, MODEL of the vehicle, the actions-engine 424 of the chatbot system may query third party sources such as a user profile 240*b* stored on the data storage component 238 of the computing device 102 or other external data sources (e.g., the server 103) for the obtaining the required entities to fulfill the task as depicted by communication lines 426 between the rules-engine 422 and the actions-engine 424. In the illustrative case, the user has previously provided information regarding a new vehicle, for example possibly during a policy quoting process. The entities obtained by the actions-engine 424 are sent back to the rules-engine 422 and confirmed with the user as depicted by communication lines 418 and 420. Once a confirmation is received as depicted by communication lines 420, the rules-engine 422 triggers the actions-engine 424 to execute the identified fulfillment task of changing the policy to add the car as depicted by communication line 428. The actions-engine 424 updates the user's policy to add the new vehicle and then stores the update user's policy in the data storage component 238.

Figure 5:
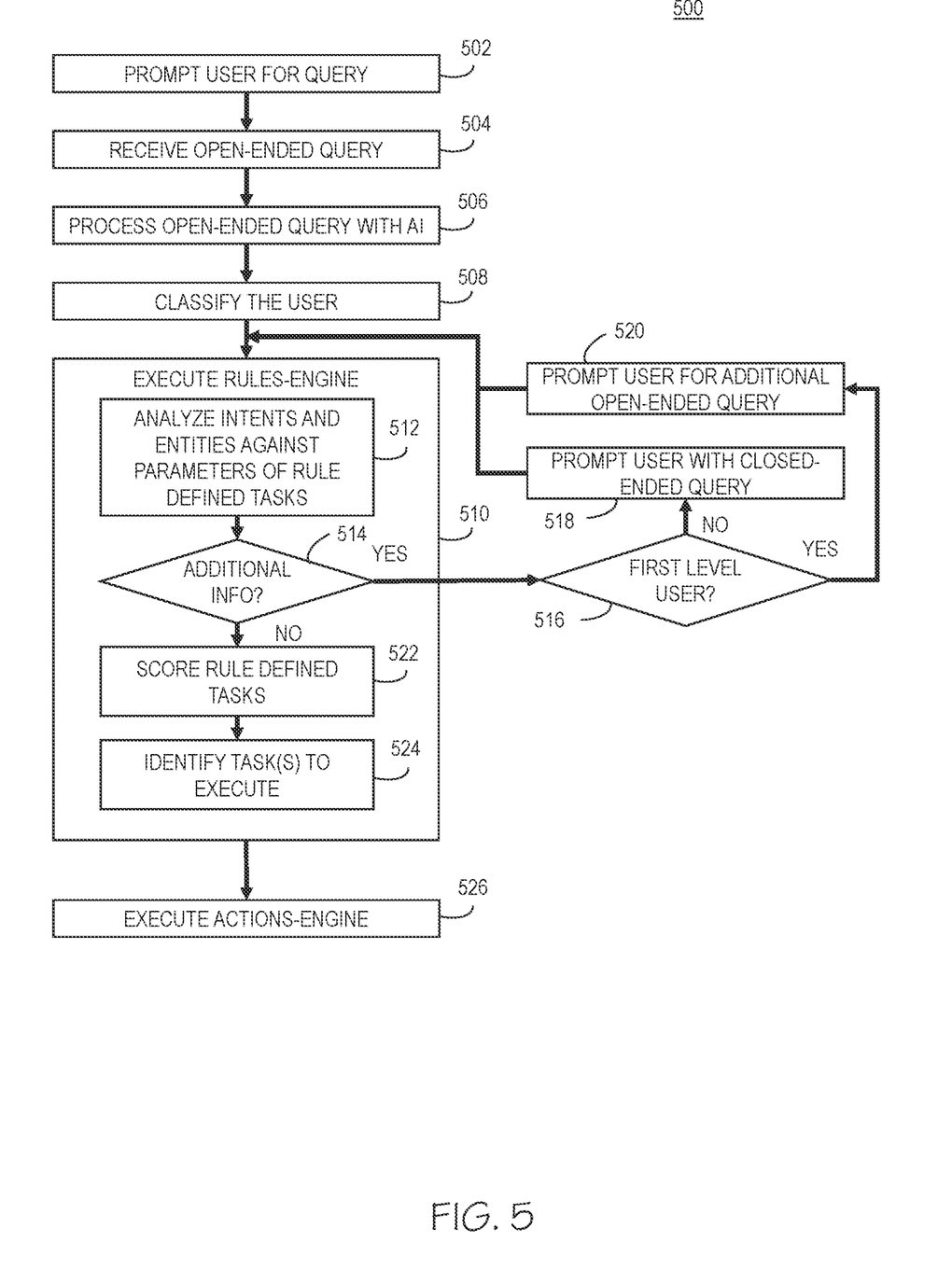
FIG. 5 depicts an illustrative flowchart of a chatbot employing user navigated design, according to one or more embodiments shown and described herein.

Turning now to FIG. 5, an illustrative control scheme as a flowchart 500 of a chatbot employing user navigated design as described herein is depicted. In particular, the flowchart 500 depicts processes implemented by the computing device 102, optionally through an application installed therein, the electronic device 104, and/or the server 103. It is further understood that blocks of the depicted and described processes may be performed in an order that is different than the one depicted herein. Additionally, there may be other processes that are implemented throughout the process described herein. Moreover, execution of the processes described herein may include multiple iterations of sets of the processes.

At block 502, the computing device 102 implementing the chatbot system 100 causes a prompt to be provided to a user to provide an open-ended query. Initialization of the chatbot and subsequently the prompt, at block 502, may be in response to a user visiting a web-based interface such as a text messenger or calling a customer support number. In embodiments, the computing device configured to generate a voice prompt and transmit the voice prompt through a voice response system to the user, generate a text-based prompt and display the text-based prompt via a display on a mobile device of the user, or combinations thereof. In response to the prompt and the user providing a response at block 504 that is received by the computing device 102, at block 506 one or more AI models 244*b* are implemented. The one or more AI models 244*b* is trained to identify one or more intents and one or more entities expressed in the open-ended query. The one or more AI models 244*b* may include one or more specific machine learning models such as a neural network, a natural language processing unit, or other like models that operate together or independently to process the open-ended query.

At block 508, the computing device 102 executes a classification process (e.g., via executing the operating logic 244*a* as described herein). The classification process classifies the user as either a first user level or a second user level based on one or more attributes of the open-ended query. The first user level indicates the user is more experienced that the second user level with respect to use of chatbots. For example, the first user level may indicate that the user is an expert user whereas the second user level indicates a user that is less experienced or sophisticated with the process they are requesting chatbot assistance with fulfilling a task.

In determining the classification of the user, various techniques and attributes of the open-ended query submitted by the user may be utilized to make the classification determination. For example, the one or more attributes of the open-ended query may include a length of the open-ended query, a number of intents expressed in the open-ended query, or a number of entities expressed in the open-ended query. The one or more attributes of the open-ended query may be determined using pre-coded algorithms that determine, for example, whether the length of the open-ended query exceeds a predetermined length threshold, a number of intents expressed in the open-ended query exceeds a predetermined intents threshold, or a number of entities expressed in the open-ended query exceeds a predetermined entities threshold. When the computing device 102 determines that at least one of the length of the open-ended query exceeds a predetermined length threshold, the number of intents expressed in the open-ended query exceeds a predetermined intents threshold, or a number of entities expressed in the open-ended query exceeds a predetermined entities threshold, the user is classified as a first level user. In some embodiments, an individual attribute or a combination of attributes may be utilized in making the classification determination of the user. Moreover, in some embodiments, an AI model may be implemented to make a classification determination. The AI model may be trained to analyze additional features of a user's response to the prompt such as how quickly a user responds, the use of syntax, the use of subject matter specific words and phrases or the like.

At block 510, the computing device 102 executes a rules-engine 244*c* configured to analyze the one or more intents and the one or more entities expressed in the open-ended query. The rules-engine 244*c* encompasses several processes. At block 512, the rules-engines analyzes the one or more intents and the one or more entities expressed in the open-ended query to determine a rule defined task as a fulfillment task that the user intends to have fulfilled and whether the required parameters for the task are provided. The rule defined task may be determined through the use of specific words of intent and/or through the entities expressed by the user. For example, intents can be expressed through entities that the user provides, such as a description of a new vehicle that they just bought. If the vehicle they are discussing is not covered by a policy, the rules-engine 244*c* may be configured to infer an intent from the entities expressed by the user. In some embodiments, a user's initial open-ended query may express an intent that corresponds to a rule defined task, but does not include sufficient entities to fulfill the task, at least from the user's first open-ended query.

At block 514, the rules-engine 244*c* makes a determination as to whether additional information relating intents or entities is needed in order to fulfill a rule defined task. The process of determining whether additional information is needed, the computing device 102 may query one or more third party sources for the additional information. By way of example and not as a limitation, and as illustrated in FIG. 4, the computing device 102 may access a user's profile or other records databases to retrieve relevant information to the fulfillment task.

When a determination of "YES" is made at block 514 that additional information is needed, the process proceeds to block 516. At block 516, a determination as to whether the user is classified as a first level user is made. If a determination of "NO" is made at block 516, indicating that the use is not a first level user and rather is a second level user who is less experienced, the process proceeds to block 518. At block 518, the computing device 102 is configured to provide closed-ended prompts to the user to solicit the necessary additional information from the user. In such a case, the chatbot experience may now be led by the chatbot as the user has been determined to not be a first level user (e.g., an expert user) and rather be a second level user (e.g., an entry level user) and thus requires some additional guidance with providing the necessary information to fulfill a task for the user.

When a determination of "YES" is made at block 516, indicating that the user is a first level user, the process proceeds to block 520. At block 520, the computing device 102 is configured to provide additional open-ended prompts to the user to solicit and analyze the necessary additional information from the user. When the user responds to the further prompts initiated by either blocks 518 or 520, the process returns to block 510, where the computing device 102 again executes the rules-engine 244*c* configured to analyze the one or more intents and the one or more entities expressed in the open-ended query.

Returning to block 514, when a determination of "NO" is made at block 514 that additional information is not needed from the user, the process proceeds to block 522. In the event that one or more of the plurality of rule defined tasks correspond to intents expressed by the user, the rules-engine 244*c* may execute a scoring process at block 522. At block 522, a scoring process may assign a score to each of the rule defined tasks based on the number of required parameters that are satisfied by the intents and entities expressed by the user. The scored plurality of rule defined tasks may further be prioritized based on their score and the specificity of the task. For example, a user may express an intent to change a policy, but they are not specific as to what policy they want to change or what changes they want to make to the policy. That is, they may express a general intent. When a general intent is expressed, follow ups from the chatbot system 100 may be needed to execute a task. In embodiments, the computing device 102 may be configured to apply a prioritization of one or more rules associated with the plurality of rule defined tasks based on the classification of the user as first level user or a second level user to use the one or more rules as prioritized to identify the fulfillment task.

In some instances, a user may express more than one desired task in their open-ended query. In such a case and other cases, the prioritization process based on the score and the specificity of the task can assist with identifying the order in which the tasks are executed. For example, if the user is expresses an intent to change an auto policy by adding a new vehicle and further provided the required entity information for executing the task based on the required parameters defined for the rule defined task, but merely expresses an intent to add another driver to the policy without entity information relating to who the additional driver will be, the task of changing the auto policy to add the new vehicle is prioritized over the adding an additional driver to the policy.

At block 524, the rules-engine 244c, executed by the computing device 102, identifies the one or more fulfillment tasks to be executed. At this step, the computing device 102 may provide a confirmation request to the user before the action is executed by the actions-engine at block 526. If a confirmation is requested and the user confirms, then at block 526, the actions-engine proceeds with fulfilling the fulfillment task.

It is understood that while the aforementioned chatbot systems 100 and methods are described with respect to updating, changing, or canceling insurance policies, implementations of the chatbot systems and methods are not limited to the insurance environment.

The functional blocks and/or flowchart elements described herein may be translated onto machine-readable instructions. As non-limiting examples, the machine-readable instructions may be written using any programming protocol, such as: (i) descriptive text to be parsed (e.g., such as hypertext markup language, extensible markup language, etc.), (ii) assembly language, (iii) object code generated from source code by a compiler, (iv) source code written using syntax from any suitable programming language for execution by an interpreter, (v) source code for compilation and execution by a just-in-time compiler, etc. Alternatively, the machine-readable instructions may be written in a hardware description language (HDL), such as logic implemented via either a field programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

It should now be understood that the systems, methods, and non-transitory mediums (computer program products) described herein relate to providing chatbots employing user navigated designs that utilize artificial intelligence models and rule-engines enabling user navigated and led conversations with chatbots. In user navigated conversations between users, for example, either party can lead the conversation and change the subject at any given time. The chatbot system 100 may include a computing device 102 configured to execute a chatbot conversation with a user in a similar fashion. As described herein, the computing device 102 is configured to prompt a user to provide an open-ended query and receive, from an input device, the open-ended query. The computing device 102 is further configured to process the open-ended query with an artificial intelligence model implemented by the computing device 102, the artificial intelligence model trained to identify one or more intents and one or more entities expressed in the open-ended query, classify the user as either a first user level or a second user level based on one or more attributes of the open-ended query, where the first user level indicates the user is more experienced with the chatbot system 100 than the second user level, and execute a rules-engine configured to analyze the one or more intents and the one or more entities identified by the artificial intelligence model and identify a fulfillment task from a plurality of rule defined tasks corresponding to the analysis of the one or more intents and the one or more entities such that the fulfillment task is identified to fulfill at least the one or more intents. Each of the plurality of rule defined tasks may include one or more required parameters defining one or more task specific intents and entities to fulfill the task. In response to classifying the user as the first user level, the fulfillment task may be executed, and, in response to classifying the user as the second user level, the user may be prompted with one or more closed-ended inquiries to obtain one or more additional intents or one or more additional entities from the user.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system comprising:
 a computing device comprising a processor and a non-transitory computer readable memory, the computing device configured to:
  prompt a user to provide an open-ended query,
  receive, from an input device, the open-ended query,
  process the open-ended query with an artificial intelligence model implemented by the computing device, the artificial intelligence model trained to identify one or more intents and one or more entities expressed in the open-ended query,
  classify the user as either a first user level or a second user level based on one or more attributes of the open-ended query, where the first user level indicates the user is more experienced with the system than the second user level, execute a rules-engine configured to analyze the one or more intents and the one or more entities identified by the artificial intelligence model and identify a fulfillment task from a plurality of rule defined tasks corresponding to the analysis of the one or more intents and the one or more entities such that the fulfillment task is identified to fulfill at least the one or more intents, wherein each of the plurality of rule defined tasks includes one or more required parameters defining one or more task specific intents and entities to fulfill the task, in response to classifying the user as the first user level:
prompt the user with one or more additional open-ended inquiries to obtain one or more additional intents or one or more additional entities, and
execute the fulfillment task, and in response to classifying the user as the second user level, prompt the user with one or more closed-ended inquiries to obtain one or more additional intents or one or more additional entities from the user.

2. The system of claim 1, wherein the computing device configured to apply a prioritization of one or more rules associated with the plurality of rule defined tasks based on the classification of the user as first level user or a second level user to use the one or more rules as prioritized to identify the fulfillment task.

3. The system of claim 1, wherein to prompt the user, the computing device configured to generate a voice prompt and transmit the voice prompt through a voice response system to the user, generate a text-based prompt and display the text-based prompt via a display on a mobile device of the user, or combinations thereof.

4. The system of claim 1, wherein the artificial intelligence model includes natural language processing configured to parse the open-ended query to identify the one or more intents and the one or more entities.

5. The system of claim 1, wherein the computing device is further configured to:
determine the one or more attributes of the open-ended query, wherein the one or more attributes include at least one of a length of the open-ended query, a number of intents expressed in the open-ended query, or a number of entities expressed in the open-ended query,
determine that at least one of the length of the open-ended query exceeds a predetermined length threshold, the number of intents expressed in the open-ended query exceeds a predetermined intents threshold, or the number of entities expressed in the open-ended query exceeds a predetermined entities threshold, and
when at least one of the at least one of the length of the open-ended query exceeds the predetermined length threshold, the number of intents expressed in the open-ended query exceeds the predetermined intents threshold, or the number of entities expressed in the open-ended query exceeds the predetermined entities threshold, classify the user as the first user level.

6. The system of claim 1, wherein identifying the fulfillment task from the plurality of rule defined tasks corresponding to the analysis of the one or more intents and the one or more entities comprises scoring the plurality of rule defined tasks based on a total number of the one or more required parameters defining the one or more task specific intents and entities to fulfill the fulfillment task that are satisfied by the one or more intents and the one or more entities expressed in the open-ended query, and
selecting the fulfillment task with a highest score determined by the scoring process.

7. The system of claim 1, wherein the computing device is further configured to:
iteratively,
process additional open-ended responses from the user in response to the one or more additional open-ended inquiries with the artificial intelligence model implemented by the computing device,
execute the rules-engine configured to analyze the one or more additional intents or the one or more entities identified by the artificial intelligence model, and
update identification of the fulfillment task from the plurality of rule defined tasks corresponding to the analysis of the one or more additional intents or the one or more entities.

8. The system of claim 1, wherein the task includes at least one of adding a new policy, removing an existing policy, or changing an existing policy.

9. The system of claim 1, wherein the computing device is further configured to:
retrieve information pertaining to one or more intents expressed in the open-ended query from a third party source.

10. A method for employing a chatbot, the method comprising:
prompting, via a computing device, a user to provide an open-ended query;
receiving, at the computing device from an input device, the open-ended query;
process the open-ended query with an artificial intelligence model implemented by the computing device, the artificial intelligence model trained to identify one or more intents and one or more entities expressed in the open-ended query;
classifying the user as either a first user level or a second user level based on one or more attributes of the open-ended query, where the first user level indicates the user is more experienced with the chatbot than the second user level;
executing a rules-engine configured to analyze the one or more intents and the one or more entities identified by the artificial intelligence model and identify a fulfillment task from a plurality of rule defined tasks corresponding to the analysis of the one or more intents and the one or more entities such that the fulfillment task is identified to fulfill at least the one or more intents, wherein each of the plurality of rule defined tasks includes one or more required parameters defining one or more task specific intents and entities to fulfill the task;
in response to classifying the user as the first user level:
prompting the user with one or more additional open-ended inquiries to obtain one or more additional intents or one or more additional entities, and
executing the fulfillment task, and
in response to classifying the user as the second user level, prompting the user with one or more closed-ended inquiries to obtain one or more additional intents or one or more additional entities from the user.

11. The method of claim 10, wherein further comprising applying a prioritization of one or more rules associated with the plurality of rule defined tasks based on the classification of the user as the first user level or the second user level to use the one or more rules as prioritized to identify the fulfillment task.

12. The method of claim 10, wherein prompting the user comprises generating a voice prompt and transmitting the voice prompt through a voice response system to the user, generating a text-based prompt and displaying the text-based prompt via a display on a mobile device of the user, or combinations thereof.

13. The method of claim 10, wherein the artificial intelligence model includes natural language processing configured to parse the open-ended query to identify the one or more intents and the one or more entities.

14. The method of claim 10, further comprising:
determining one or more attributes of the open-ended query, wherein the one or more attributes include at least one of a length of the open-ended query, a number of intents expressed in the open-ended query, or a number of entities expressed in the open-ended query,
determining that at least one of the length of the open-ended query exceeds a predetermined length threshold, the number of intents expressed in the open-ended query exceeds a predetermined intents threshold, or the number of entities expressed in the open-ended query exceeds a predetermined entities threshold, and
when the at least one of the length of the open-ended query exceeds the predetermined length threshold, the number of intents expressed in the open-ended query exceeds the predetermined intents threshold, or the number of entities expressed in the open-ended query exceeds the predetermined entities threshold, classifying the user as the first user level.

15. The method of claim 10, wherein identifying the task from the plurality of rule defined tasks corresponding to the analysis of the one or more intents and the one or more entities includes scoring the plurality of rule defined tasks based a total number of the one or more required parameters defining the one or more task specific intents and entities to fulfill the fulfillment task that are satisfied by the one or more intents and the one or more entities expressed in the open-ended query, and
selecting the task with a highest score determined by the scoring process.

16. The method of claim 10, further comprising:
iteratively,
processing additional open-ended responses from the user in response to the one or more additional open-ended inquiries with the artificial intelligence model implemented by the computing device,
executing the rules-engine configured to analyze the one or more additional intents or the one or more entities identified by the artificial intelligence model, and
updating identification of the fulfillment task from the plurality of rule defined tasks corresponding to the analysis of the one or more additional intents or the one or more entities.

17. A non-transitory computer-readable medium storing instructions that, when executed by a computer processor, cause the computer processor to perform a method associated with a chatbot, the method comprising:
prompting a user to provide an open-ended query;
receiving the open-ended query;
processing the open-ended query with an artificial intelligence model implemented by the computer processor, the artificial intelligence model trained to identify one or more intents and one or more entities expressed in the open-ended query;
classifying the user as either a first user level or a second user level based on one or more attributes of the open-ended query, where the first user level indicates the user is more experienced with the chatbot than the second user level;
executing a rules-engine configured to analyze the one or more intents and the one or more entities identified by the artificial intelligence model and identify a fulfillment task from a plurality of rule defined tasks corresponding to the analysis of the one or more intents and the one or more entities such that the fulfillment task is identified to fulfill at least the one or more intents, wherein each of the plurality of rule defined tasks includes one or more required parameters defining one or more task specific intents and entities to fulfill the task;
in response to classifying the user as the first user level:
prompting the user with one or more additional open-ended inquiries to obtain one or more additional intents or one or more additional entities, and
executing the fulfillment task, and
in response to classifying the user as the second user level, prompting the user with one or more closed-ended inquiries to obtain one or more additional intents or one or more additional entities from the user.

18. The non-transitory computer-readable medium of claim 17, further comprising:
applying a prioritization of one or more rules associated with the plurality of rule defined tasks based on the classification of the user as the first user level or the second user level to use the one or more rules as prioritized to identify the fulfillment task; and
iteratively,
processing additional open-ended responses from the user in response to the one or more additional open-ended inquiries with the artificial intelligence model implemented by the computer processor,
executing the rules-engine configured to analyze the one or more additional intents or the one or more entities identified by the artificial intelligence model, and
updating identification of the fulfillment task from the plurality of rule defined tasks corresponding to the analysis of the one or more additional intents or the one or more entities.

* * * * *